United States Patent Office 2,927,947
Patented Mar. 8, 1960

2,927,947
PROCESS OF PURIFYING HEXACHLORO CYCLOPENTADIENE

Gerhard Liedtke, Berlin, Germany, assignor to Schering A.G., Berlin, Germany, a corporation of Germany No Drawing. Application November 4, 1957
Serial No. 694,112

Claims priority, application Germany November 16, 1956

9 Claims. (Cl. 260—648)

The present invention relates to a process of purifying hexachloro cyclopentadiene and more particularly to a process of producing substantially pure hexachloro cyclopentadiene.

Hexachloro cyclopentadiene is a very important product for the production of various plant protective agents. It is also useful, for instance, as intermediate product in the synthesis of compounds useful for the production of fireproof lacquers or as starting materials for diene syntheses.

Hexachloro cyclopentadiene has been prepared by different methods, for instance, by chlorination of cyclopentadiene by means of alkali metal hypochlorites. The resulting oily crude product contains about 25% to 50% of by-products the amount of which varies with the conditions of preparation. Heretofore, hexachloro cyclopentadiene was worked up and purified by fractional distillation.

However, this purification method gives only poor results both with respect to the purity of the final product and to the yield, because the by-products, mostly cyclopentadiene derivatives containing less than 6 chlorine atoms per molecule, have boiling points very close to that of hexachloro cyclopentadiene, for instance, pentachloro cyclopentadiene with a boiling point of about 94–96° C./12 mm., while the boiling point of hexachloro cyclopentadiene is about 104–106° C./12 mm. Therefore, it is practically impossible to obtain a final product free from pentachloro cyclopentadiene even after repeated fractionation.

Furthermore, during such fractional distillation which requires elevated temperatures and a thermal treatment, the chlorinated cyclopentadienes decompose and split off hydrogen chloride. Due thereto, the purity of the distilled hexachloro cyclopentadiene is considerably reduced.

Moreover, the different chlorinated cyclopentadienes undergo Diels-Alder reaction at the elevated temperatures necessary for distillation, whereby a considerable amount of the hexachloro cyclopentadiene present in the crude oil is chemically bound and cannot be isolated.

Furthermore, in order to purify crude hexachloro cyclopentadiene, attempts have been made to convert, by heat treatment, lower boiling impurities into higher boiling products in order to achieve better separation on fractional distillation. But this method, too, causes loss of part of the hexachloro cyclopentadiene.

It is one object of the present invention to overcome all the above mentioned disadvantages of the heretofore known and used methods of purifying hexachloro cyclopentadiene and to provide a simple and effective method of producing substantially pure hexachloro cyclopentadiene in a high yield.

Other objects of the present invention and advantageous features thereof will become apparent as the description proceeds.

In principle, the process according to the present invention consists in cooling crude hexachloro cyclopentadiene to a temperature considerably below 0° C. It is surprising that at such a low temperature selective crystallization of substantially pure hexachloro cyclopentadiene takes place. It was found that the temperature must be at least as low as $-10°$ C. in order to obtain a sufficient amount of pure hexachloro cyclopentadiene. A temperature between about $-40°$ C. and $-80°$ C. and preferably a temperature of about $-60°$ C. have proved to be especially suitable for this purpose.

Although it is possible to cause purification of crude hexachloro cyclopentadiene by simply cooling said crude product to $-60°$ C., while stirring, and separating the crystals from the mixture, the preferred and most suitable method of purifying crude hexachloro cyclopentadiene according to the present invention consists in cooling a solution of crude hexachloro cyclopentadiene in a suitable solvent or solvent mixture to such a low temperature and recovering the precipitated crystals of pure hexachloro cyclopentadiene which are free from all by-products present in the crude starting material including pentachloro cyclopentadiene. The hexachloro cyclopentadiene obtained thereby is of a purity which cannot be attained by repeated fractional distillation. This new method is much superior to all heretofore known methods by its extreme simplicity and, as stated above, the results achieved are quite surprising, particularly as it is well known that, when being highly impure, even readily crystallizing compounds need an extraordinary amount of time and solvents for purification. All the more surprising is the result that, when proceeding according to the new method, hexachloro cyclopentadiene is purified to a high degree of purity and with a very good yield. Furthermore it is unexpected that only hexachloro cyclopentadiene and not also pentachloro cyclopentadiene or other impurities crystallize.

Particularly useful solvents are methanol, ethanol, propanol-1, propanol-2, and acetone. Using a mixture of propanol-2 and acetone and of methanol and acetone and of ethanol and acetone produces particularly good results as in these solvents the by-products are readily soluble at the low temperature employed in contrast to hexachloro cyclopentadiene which has only a slight solubility in said solvents. These special solubility relations are entirely unexpected.

Less suitable than the alcohols and acetone are other solvents, such as low boiling solvents derived from petroleum, for instance, petroleum ether and benzine. Of course, only such solvents are suitable which have a high dissolving power for pentachloro cyclopentadiene and a low dissolving power for hexachloro cyclopentadiene at the low temperatures at which crystallization of the hexachloro compound is effected.

As stated above, it is also possible to operate in the absence of solvents. However, this process has the great disadvantage that the precipitated crystals can be separated from the viscous oily by-products only with great difficulty. It is necessary to wash the filtered crystals with the above mentioned solvents cooled to the above mentioned low temperatures. Such a process is evidently more complicated than the process wherein crystallization is effected from solutions of the crude starting material in the above mentioned solvents and especially in methanol, ethanol, propanol-1, propanol-2, acetone, or mixtures thereof.

The resulting hexachloro cyclopentadiene is ordinarily free from by-products. However, if a crude starting material is used which is contaminated by large amounts of by-products, usually a single recrystallization step produces analytical grade products. In addition, the hexachloro cyclopentadiene is completely free of hydrogen chloride which is always present in small amounts in hexachloro pentadiene purified by fractional distillation.

Hexachloro cyclopentadiene purified following the method according to the present invention has a melting point of 12° C. and a boiling point of 106° C./12 mm. Pure hexachloro cyclopentadiene is soluble in acetone, propanol, isopropanol, ethylacetate, pentane, carbontetrachloride, ether, toluene, benzene and other solvents. Its $n_{21}^D$ is 1.5638, the solid is a white crystalline substance. It is assumed that the purified crystalline compound is present in the monomer state. It is, however, also possible that a polymer is involved.

According to another embodiment of the present invention there may advantageously be employed as starting material for purification the crude solutions which are obtained by chlorinating cyclopentadiene with an alkali metal hypochloride in a solvent which is water immiscible or difficultly miscible with water, such as petroleum ether as benzene.

In this case the solvent layer containing the chlorination product is separated from the aqueous layer and is directly subjected to the purification process according to the present invention without isolation of the crude hexachloro cyclopentadiene.

The resulting purified hexachloro cyclopentadiene is especially suitable for carrying out diene syntheses because it yields diene adducts of exceptional purity. Furthermore, the yields of the diene adducts is much better than that achieved by using hexachloro cyclopentadiene purified by fractional distillation because side-reactions with impurities cannot take place. Isolation of the resulting diene adducts is also facilitated when using hexachloro cyclopentadiene purified according to the present invention because the by-products produced when using impure hexachloro cyclopentadiene as obtained heretofore or the impurities of said compound remaining in the reaction solution render crystallation and separation of the desired reaction products rather difficult.

The following example serves to illustrate the present invention without, however, limiting the same thereto.

*Example 1*

The crude hexachloro cyclopentadiene obtained by, for instance, chlorination of cyclopentadiene with alkali metal hypochlorite (molar ratio 1:8) at temperatures below 15° C. is treated as follows after drying:

214 grams of the crude product are dissolved in 107 ml. of methanol at a normal room temperature and cooled to —20° C. in a freezing-mixture. By scratching, formation and separation of crystals is initiated which can be greatly increased by further cooling to —60° C. After approx. 15 minutes, the crystals are filtered off by suction using precooled apparatus, and the crystallisate is being washed with 35 ml. of methanol cooled likewise. The yield comes to 113 grams of an already very pure hexachloro cyclopentadiene of B.P. 105–107° C. (12 mm.) The said product contains traces of solvents from which it can be freed by known methods, for instance, by keeping it in a vacuum desiccator or by treating it in a stream of air. The preparation can immediately be used for diene-syntheses without distillation.

*Example 2*

The crude product obtained by chlorination of cyclopentadiene with alkali metal hypochlorite (molar ratio 1:8) at a temperature below 15° C. is treated as follows:

50 g. of said crude product are dissolved in a mixture of 18 cc. of propanol-2 and 18 cc. of acetone and cooled to —70° C. Crystallization is initiated by scratching or by seeding with seed crystals of crystallized hexachloro cyclopentadiene. After 45 minutes the crystals are filtered off by suction using precooled apparatus. Then, the crystals are washed with a mixture of 20 cc. of propanol-2 and 10 cc. of acetone cooled to —70° C. The yield is 27.6 g. of very pure hexachloro cyclopentadiene. Said product contains still traces of solvents from which it can be freed by known methods, for instance, by keeping it in a vacuum desiccator. Another crop of crystals can be obtained from the mother liquor.

To obtain a product sufficiently pure for analysis, the hexachloro cyclopentadiene may be recrystallized from a mixture of 12 cc. of propanol-2 and 8 cc. of acetone by cooling its solution therein to —70° C. The crystals are filtered off by suction and washed with a cooled mixture of 10 cc. of propanol-2 and 5 cc. of acetone. The yield is 21.3 g. of hexachloro cyclopentadiene. Its melting point is 11.5–12° C.; its boiling point is 106° C./12 mm.

Analysis:

| | Percent |
|---|---|
| Calculated | 22.01 C |
| Found | 22.0 C |
| Calculated | 77.99 Cl |
| Found | 78.5 Cl |

The product is free of pentachloro cyclopentadiene.

In place of a mixture of propanol-2 and acetone, there may also be used the pure solvents or ethanol, propanol-1, petroleum ether or gasoline, but the two last mentioned solvents do not give as good results as the propanols and acetone.

*Example 3*

50 grams of crude hexachloro cyclopentadiene are cooled in a freezing-mixture to —70° C. and subsequently seeded with crystallized hexachloro cyclopentadiene. After approximately 3 hours the mixture is crystallized. It will then be warmed to —30° C. and the crystallisate sucked off in precooled apparatus. Yield: 19.1 grams. This product will be stirred in 30 ml. of isopropanol of —50° C. and then sucked off once again. Yield: 14.3 grams of highly enriched hexachloro cyclopentadiene of B.P.$_{12}$ 103–106° C.

Of course, many changes and variations in the crude starting material used, in the solvents and solvent mixtures employed, in the proportion of solvent to crude product, in the cooling temperature and duration, in the methods of working up, further purifying, and isolating the resulting pure hexachloro cyclopentadiene, and the like may be made by those skilled in the art in accordance with the principles set forth herein and in the claims annexed hereto.

I claim:

1. In a process of purifying hexachloro cyclopentadiene, the steps which comprise dissolving oily crude hexachloro cyclopentadiene in methanol, cooling the resulting solution to a temperature between about —30° C. and about —80° C. keeping the solution at said temperature to cause crystallization of substantially pure hexachloro cyclopentadiene, and separating the resulting crystals from the mother liquors.

2. The process according to claim 1, wherein the solution of oily crude hexachloro cyclopentadiene is cooled to and is kept at a temperature of about —60° C.

3. In a process of purifying hexachloro cyclopentadiene, the steps which comprise dissolving oily crude hexachloro cyclopentadiene in ethanol, cooling the resulting solution to a temperature between about —30° C. and about —80° C. keeping the solution at said temperature to cause crystallization of substantially pure hexachloro cyclopentadiene, and separating the resulting crystals from the mother liquors.

4. The process according to claim 3, wherein the solution of oily crude hexachloro cyclopentadiene is cooled to and is kept at a temperature of about —60° C.

5. In a process of purifying hexachloro cyclopentadiene, the steps which comprise dissolving oily crude hexachloro cyclopentadiene in a mixture of propanol-2 and acetone, cooling the resulting solution to a temperature between about —30° C. and about —80° C., keeping the solution at said temperature to cause crystallization of substantially pure hexachloro cyclopentadiene, and separating the resulting crystals from the mother liquor.

6. The process according to claim 5, wherein the solution of oily crude hexachloro cyclopentadiene is cooled to and is kept at a temperature of about −60° C.

7. In a process of purifying hexachloro cyclopentadiene, the steps which comprise dissolving oily crude hexachloro cyclopentadiene in a solvent selected from the group consisting of methanol, ethanol, propanol-1, propanol-2, acetone, and mixtures thereof, cooling the resulting solution to a temperature between about −10° C. and about −80° C., keeping the solution at said temperature to cause crystallization of substantially pure hexachloro cyclopentadiene, and separating the resulting crystals from the mother liquor.

8. In a process of purifying hexachloro cyclopentadiene, the steps which comprise cooling crude oily hexachloro cyclopentadiene to a temperature not exceeding about −10° C. until crystallization of substantially pure hexachloro cyclopentadiene is completed, separating the resulting crystals from the remaining non-crystallized oil, and washing said crystals at said temperature with substituted-petroleum ether having a high dissolving power for pentachloro cyclopentadiene and a low dissolving power for hexachloro cyclopentadiene at said low temperature.

9. In a process of purifying hexachloro cyclopentadiene, the steps which comprise cooling a solution of the reaction mixture obtained on chlorinating cyclopentadiene with alkali metal hypochlorite in at least one organic solvent selected from the group consisting of petroleum ether, and benzene and separating the resulting organic solvent layer from the aqueous layer of the reaction mixture, to a temperature to between about −10° C. and about −80° C. until crystallization of substantially pure hexachloro cyclopentadiene is completed, and separating the resulting crystals from the remaining solution.

References Cited in the file of this patent

Straus et al.: Ber. der deut. Chem. Gesell., vol. 63, p. 1884 (1930).
Prins: Rec. des Trav. Chim. des Pays-Bas, vol. 65, p. 465 (1946).
Krynitsky et al.: Jour. Am. Chem. Soc., vol. 71, pp. 816–819 (1949).